United States Patent
Chekroun et al.

(10) Patent No.: US 8,593,332 B2
(45) Date of Patent: Nov. 26, 2013

(54) DEVICE FOR DETECTING OBJECTS, NOTABLY DANGEROUS OBJECTS

(76) Inventors: Claude Chekroun, Gif sur Yvett (FR); Gilles Chekroun, Gif sur Yvette (FR)

(*) Notice: Subject to any disclaimer, the term of this patent is extended or adjusted under 35 U.S.C. 154(b) by 463 days.

(21) Appl. No.: 12/742,884

(22) PCT Filed: Nov. 12, 2008

(86) PCT No.: PCT/EP2008/065361
§ 371 (c)(1),
(2), (4) Date: Feb. 2, 2011

(87) PCT Pub. No.: WO2009/062946
PCT Pub. Date: May 22, 2009

(65) Prior Publication Data
US 2011/0175765 A1 Jul. 21, 2011

(30) Foreign Application Priority Data
Nov. 13, 2007 (FR) ..................... 07 07968

(51) Int. Cl.
*G01S 13/00* (2006.01)
(52) U.S. Cl.
USPC ............................ 342/54; 342/118; 342/176
(58) Field of Classification Search
USPC ............................................. 342/54, 118, 176
See application file for complete search history.

(56) References Cited

U.S. PATENT DOCUMENTS

| | | | |
|---|---|---|---|
| 5,501,222 A * | 3/1996 | Briggs | 600/453 |
| 7,034,746 B1 | 4/2006 | McMakin et al. | |
| 7,170,440 B1 | 1/2007 | Beckner | |
| 2006/0198004 A1 * | 9/2006 | Ozawa | 359/209 |
| 2007/0052576 A1 | 3/2007 | Hausner et al. | |
| 2007/0102629 A1 | 5/2007 | Richard et al. | |
| 2009/0195435 A1 * | 8/2009 | Kapilevich et al. | 342/22 |
| 2010/0103019 A1 * | 4/2010 | Ammar | 342/22 |
| 2010/0214150 A1 * | 8/2010 | Lovberg et al. | 342/22 |

FOREIGN PATENT DOCUMENTS

| | | |
|---|---|---|
| FR | 2841387 A1 | 12/2003 |
| FR | 2864307 A1 | 6/2005 |
| FR | 2886413 A1 | 12/2006 |
| WO | 2009/053960 A2 | 4/2009 |

OTHER PUBLICATIONS

Frank Gumbmann et al., "Optimization of a Fast Scanning Millimetre-Wave Short Range SAR Imaging System", Proceedings of the 4th European Radar Conference, Oct. 10, 2007, pp. 24-27, IEEE Piscataway, NJ, USA, XP002484675.

Hue Phat Tran, et al., "A Fast Scanning W-Band System for Advanced Millimetre-Wave Short Range Imaging Applications", 3rd European Radar Conference, Sep. 1, 2006, pp. 146-149, IEEE, Piscataway, NJ, USA, XP031006005.

* cited by examiner

*Primary Examiner* — Timothy A Brainard
(74) *Attorney, Agent, or Firm* — Baker Hostetler LLP

(57) ABSTRACT

The present invention relates to a device for detecting objects. The device comprises at least one microwave-frequency transmitter and one microwave-frequency receiver. The receiver makes a relative rotary movement about the transmitter, a signal being transmitted toward an individual for several positions of the receiver on the circle of relative rotation, the signals reflected by points of an object and received by the receiver at the positions being supplied to processing means in order to form a radar image. The receiver and the transmitter can be installed on a disk with a very low moment of inertia. The invention applies notably for the detection of weapons or explosives carried by persons.

13 Claims, 7 Drawing Sheets

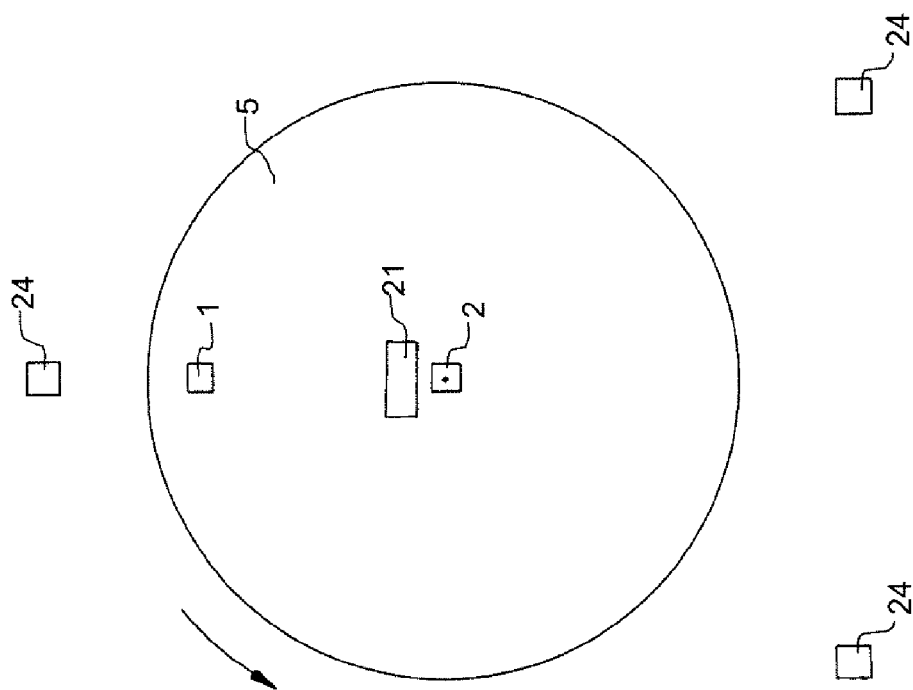
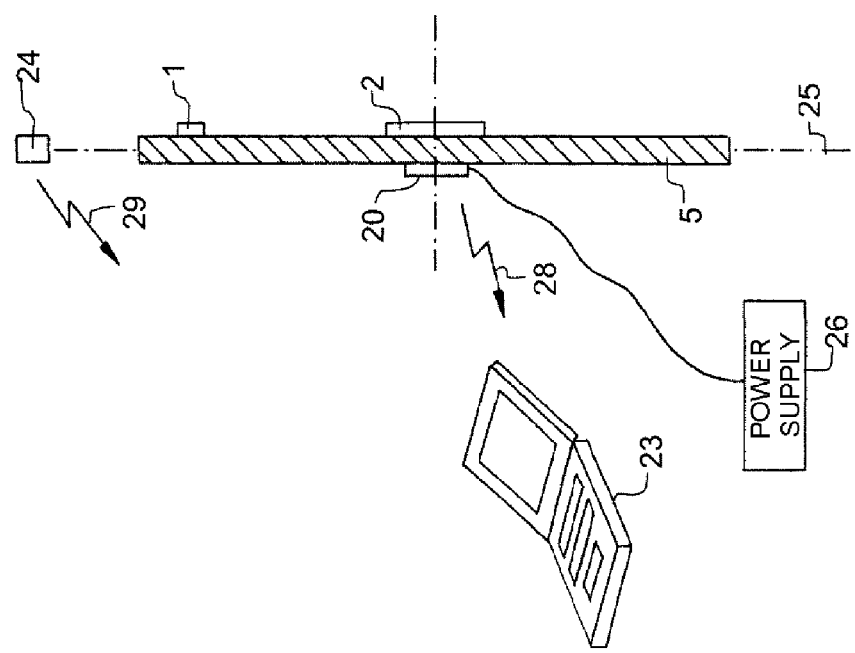

DEVICE FOR DETECTING OBJECTS, NOTABLY DANGEROUS OBJECTS

CROSS-REFERENCE TO RELATED APPLICATIONS

This application is a National Stage of International patent application PCT/EP2008/065361, filed on Nov. 12, 2008, which claims priority to foreign French patent application No. FR 07 07968, filed on Nov. 13, 2007, the disclosures of which are hereby incorporated by reference in their entirety.

FIELD OF THE INVENTION

The present invention relates to a device for detecting objects. It applies notably for the detection of weapons or explosives carried by persons.

BACKGROUND OF THE INVENTION

The security of goods and of persons requires tools that are ever more effective against threats that are potentially ever more numerous and more destructive. Security devices, in particular for detecting weapons or explosives must therefore be installed in public places notably such as airports, railway stations, subways stations, conference or exhibition locations, law courts or embassies.

A known detection solution uses a passive scanner which captures electromagnetic radiation, notably in the W frequency band. The scanner analyzes the thermal image and displays on the screen of a user the location of the detected risky element. Specifically, the body of a person transmits much radiation in this frequency band as a function of the temperature of the object to be detected. The scanner can therefore detect the contrast in temperature with objects having a different constitution, made of metal, plastic, ceramic or of composite material, and which are often used for making weapons or explosives. These objects contrast strongly with the image of the person. Another known solution is an active electronic scanner which operates according to a holographic process.

Such devices, passive or active, are costly and complex. They can therefore not be installed in large quantities, notably in the public places in which the security conditions require hundreds to several thousands of items of equipment.

SUMMARY OF THE INVENTION

One object of the invention is notably to make it possible to produce a device for detecting objects, represented by one or more dihedrons, said device being effective and economical. Accordingly, the subject of the invention is a device for detecting at least one object carried by an individual, comprising at least one microwave-frequency transmitter and one microwave-frequency receiver, characterized in that the receiver makes a relative rotary movement about the transmitter, a signal being transmitted toward the individual for several positions of the receiver on the circle of relative rotation, the signals reflected by points of an object and received by the receiver at the positions being supplied to processing means in order to form a radar image.

The transmitter transmits for example on two polarizations, the nature of an object being defined as a function of the polarization of the reflected signals.

The transmission source transmits for example in the band of millimetric frequencies.

A further subject of the invention is a detection system comprising several devices as described above.

BRIEF DESCRIPTION OF THE DRAWINGS

Other features and advantages of the invention will become apparent with the aid of the following description made with respect to appended drawings which represent:

FIGS. 2a and 2b, respectively a view in section and a front view of an exemplary embodiment of a device according to the invention;

DETAILED DESCRIPTION

Figure 1:
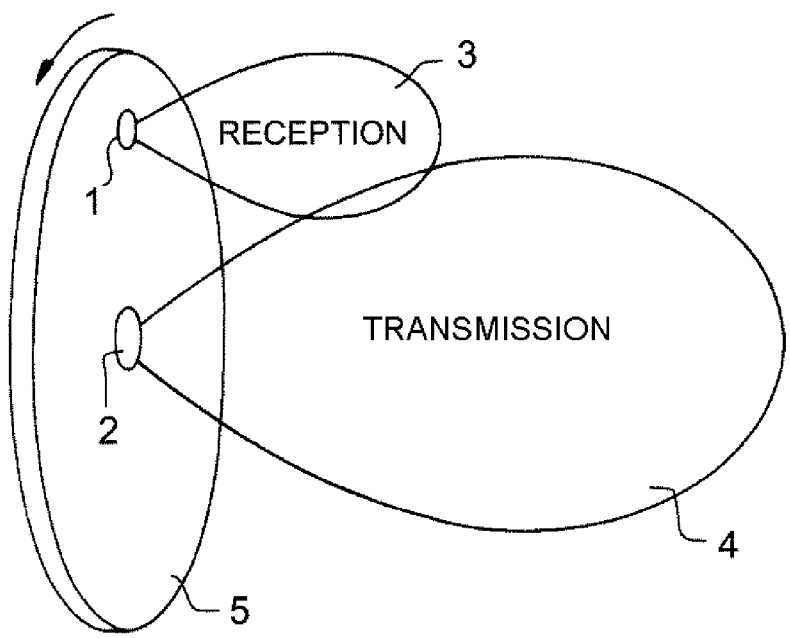
FIG. 1, an illustration of the principle of producing a device according to the invention.

FIG. 1 illustrates the principle of producing a device according to the invention. It comprises a microwave-frequency receiver 1 rotating around a point on which a microwave-frequency transmitter 2 is situated. This device therefore produces a receiving beam 3 in rotation about a transmitting beam 4.

The positions of the receiver 1 and of the transmitter 2 can be inverted. In this case, the transmitting beam rotates around the central point. In any case, whether the transmitter moves in a circle in rotation and the receiver is at a fixed point, or the receiver moves in a circle in rotation and the transmitter is at a fixed point, the transmitter has a relative rotary movement relative to the receiver. The receiver 1 is for example attached to a disk 5 adapted to move in rotation, preferably with a low moment of inertia. The transmitter 2 is for example attached to the axis of rotation of the disk 5 so as to rotate for example on itself.

FIGS. 2a and 2b show respectively a view in section and a front view of a particular exemplary embodiment of a device according to the invention. The disk 5 is for example made of a material of the DVD, or laser disk, type advantageously having a low moment of inertia. Its diameter may be of the order of 20 to 60 centimeters for example. The diameter depends notably on the distance from the receiver 1 to the center.

The disk 5 is conventionally rotated by a motor 20. This motor is for example a brushless synchronous motor. It is mounted on the disk. The rotation speed may go from a few revolutions per second up to several tens of revolutions per second. The rotation speed may be controlled by a closed-loop control, using for example Hall effect sensors or laser sensors in order to sense the angular position of the disk. The electric power is supplied to the motor 20 by an electric power supply unit 26.

The transmitter 2 uses for example a diode of the Gunn type coupled to an antenna of the patch type. It transmits for example along two reverse circular polarizations, in the W frequency band. The receiver 1 comprises for example the same type of antenna as that of the transmitter 2.

Attached close to the transmitter, near the center of the disk 5, are for example the transmit and receive circuits 21 that will be described below. These circuits comprise analog-digital converters which convert the received signals to digital format. The latter are then sent for example via a wireless link 28, of the WiFi type, to a central unit 23 which may be a computer fitted with means necessary for the processing and analysis of the received signals.

In a particular embodiment, the device may contain two receivers 2, one being for example situated on the periphery of the disk and the other at a distance closer to the center. This gives slightly different observation angles, which notably has the effect of improving the signal-to-noise ratio by decorrelating the secondary antenna lobes from the main lobe. A switch provides the link between the receive antenna of each of the two receivers in order to allow the use of one or the other receiver.

Fixed laser telemeters 24 are for example placed around the disk 5 in rotation. These telemeters 24, numbering at least three, conventionally make it possible to compute, by a triangulation method, the distance of an individual relative to the plane 25 in which the transmitter 2 and the receiver 1 are situated, an object to be detected being able to be carried by the individual. Once this distance information is known, the radar detection means, comprising the transmitter 2 and the receiver 1, can then focus the detection on this distance. In other words, a plane in which the individual is situated is determined and then the device focuses the detection in this plane.

This plane in which the individual is situated may be at a distance of one meter to several meters. The accuracy obtained may be less than one centimeter. The measurements taken by the telemeters are for example transmitted to the processing means 23 via a wireless link 29. The distances are conventionally obtained by triangulation methods.

Figure 3:
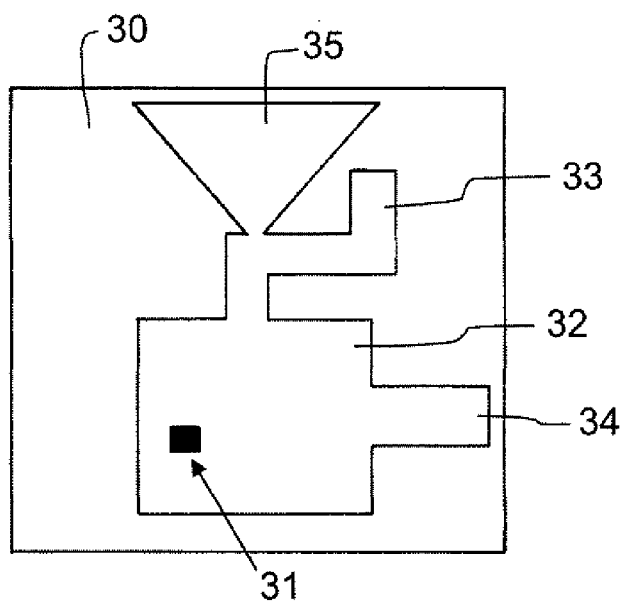
FIG. 3, an exemplary embodiment of a transmitter used in a device according to the invention.

FIG. 3 illustrates an exemplary embodiment of the transmitter 2 based on a Gunn diode. More particularly, FIG. 3 shows the microwave-frequency source formed by the Gunn diode 31. The Gunn diode is implemented on a metalized patch 32, leading simultaneously to the electrical power supply and propagating the microwave-frequency wave. Accordingly, the track comprises an arm 33 designed to be connected to an electric power supply circuit and an arm 34 supplying the microwave-frequency output signal to a receiver. The track moreover comprises a quarter-wave adapter on the power supply arm to prevent the microwave-frequency wave produced by the diode from being propagated to the electric power supply. The track 31 is attached to a dielectric substrate 30 itself implemented on the disk 5.

The Gunn diode 31 is supplied by an electric circuit connected to the power supply arm 33. This circuit is for example electrically connected to the power supply unit 26 via a conductive rotating seal. The voltage and the current generated for the Gunn diode are respectively of the order of 1 to 2 volts and of 200 milliamperes for example.

The transmit antenna, of the patch type, transmits along a polarization. It is attached to the disk 5 close to the substrate 30 supporting the Gunn diode. A polarization rotator consisting of three grids of continuous wires oriented at 45° of the linear polarization transforms this linear polarization into circular polarization. For the receive antenna, the patch receives along both polarizations. The same rotator transforms the incident circular polarization along one of the two polarizations depending on whether it is circular left or circular right.

Figure 4:
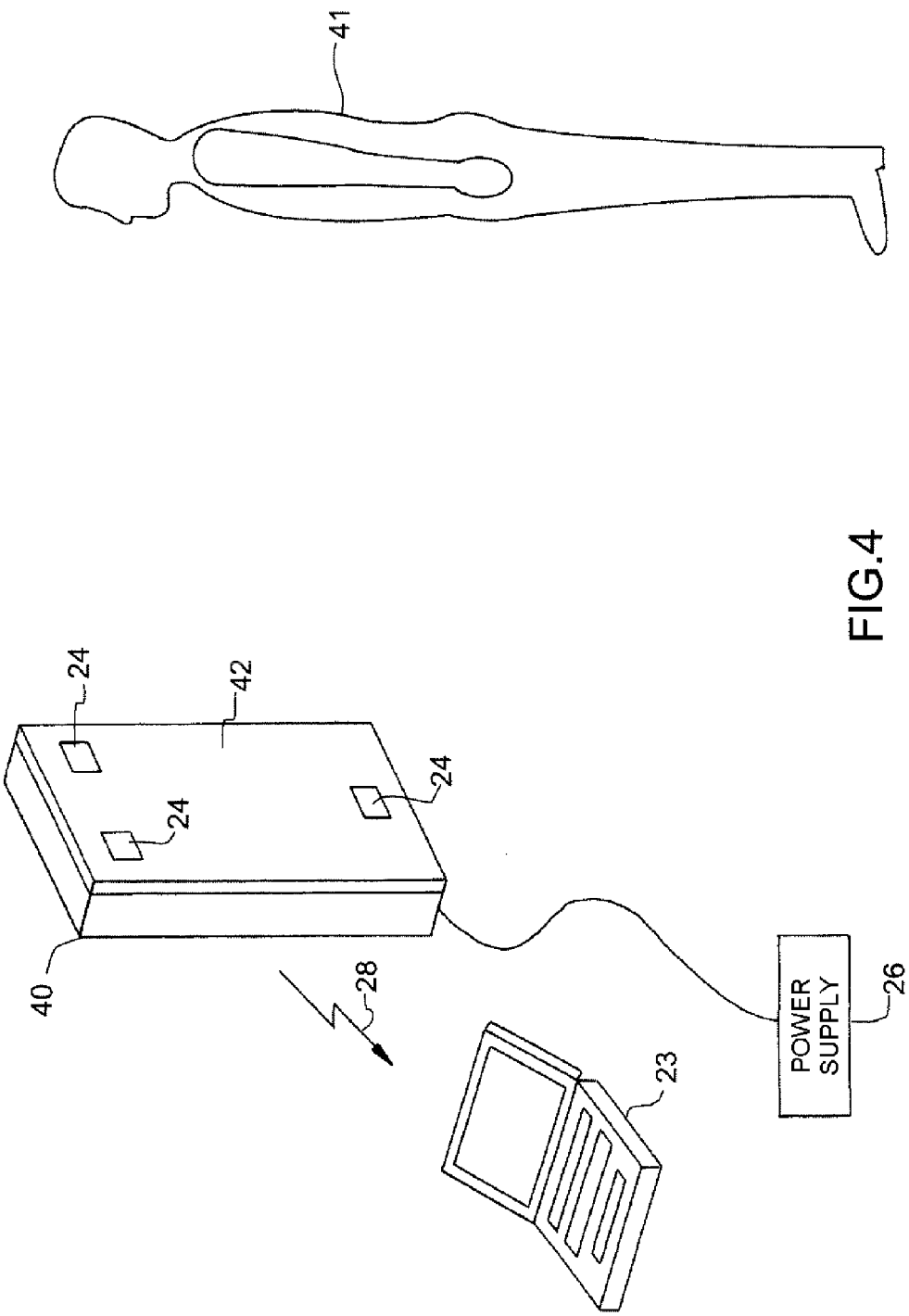
FIG. 4, an example of packaging of a device according to the invention.

FIG. 4 shows an individual 41 facing a detection device according to the invention. The disk 5 fitted with the radar detection means 1, 2 is placed in a case 40 the front face of which is closed by a radome 42 allowing the electromagnetic waves to pass through. The laser telemeters 24 are installed on the front face. The case has a flattened square shape, its thickness may be of the order of 5 centimeters and its sides of the order of 25 to 50 centimeters depending on the dimensions required for the disk 5.

Figure 5:
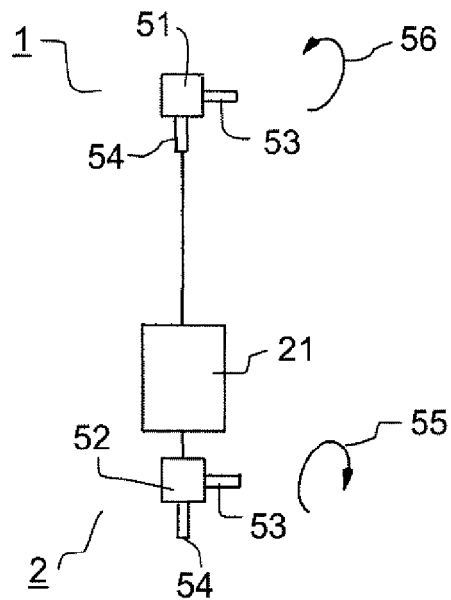
FIG. 5, an illustration of the relative positions of the transmit and receive antennas and their associated polarizations.

FIG. 5 illustrates the relative positions of the radar detection means. The transmitter 2 is represented by its patch antenna 52 and the receiver 1 is represented by its patch antenna 51. Each antenna has two polarization channels 53, 54. The two antennas 51, 52 are of similar shapes and have their polarization channels 53, 54 oriented in the same directions. They are connected to the transmit and receive circuits 21.

In the example of FIG. 5, a right circular polarization wave 55 is transmitted by the transmit antenna to a target and then the reflected wave is received by the receive antenna on a left circular polarization 56. Depending on the nature of the reflective surface, the polarization may or may not be reversed. The invention advantageously makes use of this property. In particular, if the wave is reflected by a dihedron, the polarization is not reversed, but it is for the reflection produced by a plate.

Figure 6A:
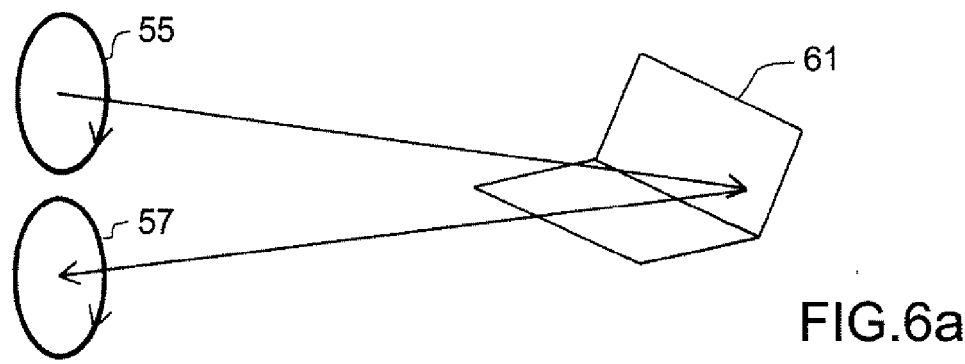
FIGS. 6a and 6b, an illustration of changes of polarization when there are reflections on a dihedron or a flat surface.

FIG. 6a shows the transmission of a right circular wave 55 reflected by a dihedron 61; the received reflected wave retains the right circular polarization 55. In this case the receive antenna receives the reflected signal on its right circular polarization channel 53.

Figure 6B:
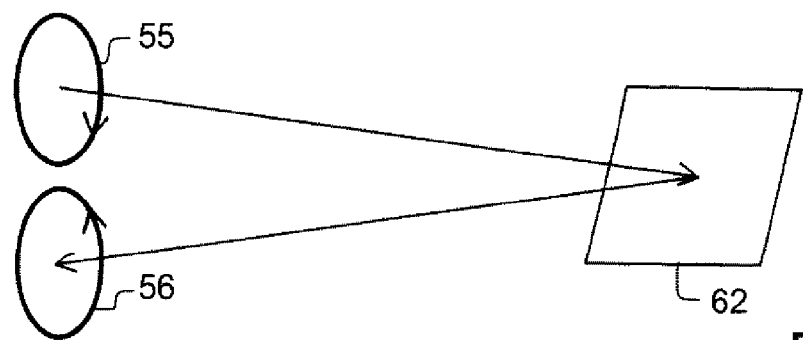

FIG. 6b shows the transmission of a right circular wave 55 reflected by a flat surface 62; the reflected wave has a reversed, left circular polarization 57. In this case, the receive antenna receives the reflected signal on its circular polarization channel 54. Detection on one or the other channel therefore makes it possible to detect the nature of the reflective surface.

Figure 7:
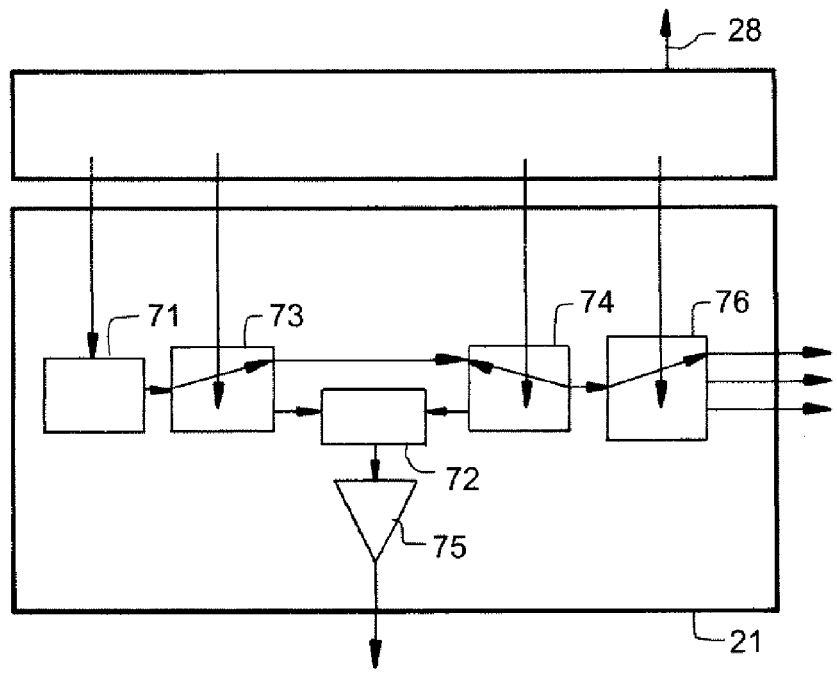
FIG. 7, an exemplary embodiment of a transmit and receive module used in a device according to the invention.

FIG. 7 illustrates a particular embodiment of a transmit and receive module 21 capable of being used in a device according to the invention.

This module 21 comprises a local oscillator 71, supplying for example a frequency of 77 GHz. In receive mode, the local oscillator is connected to a mixer 72 via a first switch 73. In this case, the received signal is directed via a second switch 74 to the mixer. The output of the mixer is connected to the input of a low-noise amplifier 75, the output signal of this amplifier is then sent, after digital conversion, to the central unit 23. A beam-selection circuit 76 is connected to the transmit antenna 52 and receive antenna 51. The module comprises an electronic unit notably carrying out the control of the aforementioned components, the analog-digital conversion of the received signals and the transmission of the digitized data to the central unit 23 via the wireless link 28.

Figure 8:
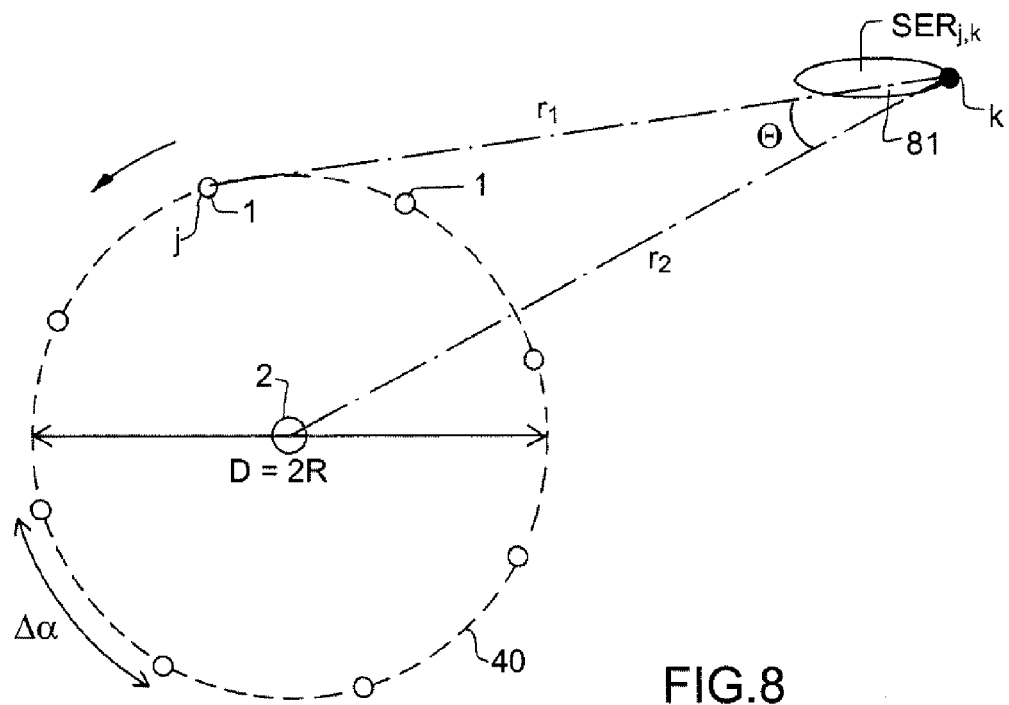
FIG. 8, an illustration of the operating principle of the scanner formed by the rotation of a receiver in a device according to the invention.

FIG. 8 illustrates the operation of a device according to the invention for the detection of the shapes of the objects to be detected. The presentation is made for the receiver 1 in rotation. The result obtained is the same in the case of a transmitter in rotation. FIG. 8 therefore shows a receiver 1 in rotation, on a circle 40 of diameter D=2R. At regular time intervals Δt defining an angle pitch Δα between two successive positions of the receiver 1 on the circle 40, a signal is transmitted by the transmitter 2.

A set of receivers placed along the circle 40 is then reconstituted in time as in an application of the SAR type notably, thus allowing the detection of simple shapes. Specifically, based on the detected bright points, a signal reconstitution is carried out making it possible to detect notably small dihedrons. Even if it is not always possible to reconstitute the entire shape of an object comprising the detected dihedron(s), it is not a problem for the practical application of the invention. Specifically, the detection of one or more reflecting dihedrons could be considered as a serious indicator of suspicion in order to begin for example a more in-depth search of the individual carrying them.

A bright point is in this instance a point or an elementary surface reflecting the electromagnetic waves.

FIG. 8 illustrates the detection of a bright point k by reflection of a signal transmitted and then received by the receiver 1 at a position j on the circle 40. The bright point k is at the distance $r_1$ from the transmission source and at a distance $r_2$ from the receiver. The signal $s_e$ transmitted at this point is defined by its amplitude A and its phase φ, $s_e$ can therefore be given by the following relation:

$$s_e = A e^{j\phi} \quad (1)$$

The reflected signal received by the receiver 2 undergoes the following phase shift Δφ:

$$\Delta\phi = e^{-jK(r_1+r_2)} e^{j2\pi f_d t} \quad (2)$$

where $K=2\pi/\lambda$, λ being the length of the transmitted wave and $f_d$ corresponds to the Doppler effect of the transmitter in rotation, t being time; $f_d$ is equal to $(2\pi RN/\lambda)\cos\theta(r_1)$, N being the number of revolutions per second and $\theta(r_1)$ the angle of the bright point and of the tangent to the circle at the point of reception.

The phase and the amplitude of the received signal are measured at each point of reception j of the circle 40. This measurement is notably a function of the gain on transmission, the amplitude A of the transmitted signal, and of the gain on reception.

As indicated above, the use of a circular polarization allows an analysis of the two polarizations reflected by the radar-equivalent surface $SER_{j,k}$ at the point k. This analysis, carried out for example by the processing means fitted to the unit 23, makes it possible to distinguish the dihedrons of the flat reflective surfaces, or of other shapes such as trihedrons. The dihedrons or the discontinuities are elements that make it possible to identify objects, because they notably delimit the objects.

The detection is bistatic because the transmission source 2 is not situated in the same location at the reception 1. An object element situated at the point k has a distatic radar-equivalent surface $SER_{j,k}$. This surface is dependent on the polarization. Its analysis makes it possible to define whether or not it is a dihedron. The detections are more effective if the backscatter diagram 81 of the surface $SER_{j,k}$ covers the circle 40 traveled by the receiver 1.

The radar-equivalent surfaces $SER_{j,k}$ that are analyzed are of the order of a few square centimeters to a few tens of square centimeters. They reflect the dimensions of the objects that it is sought to detect.

It is therefore necessary to adapt the physical magnitudes of the device according to the invention in order to obtain a transverse resolution and a depth of field of the transmission/reception system that are compatible with the dimensions of these objects to be detected.

Figure 9B:
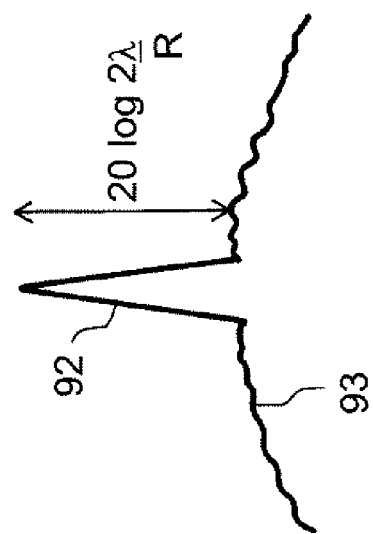
FIGS. 9a and 9b, respectively an illustration of the transverse resolution and of the signal-to-noise ratio during a detection.
Figure 9A:
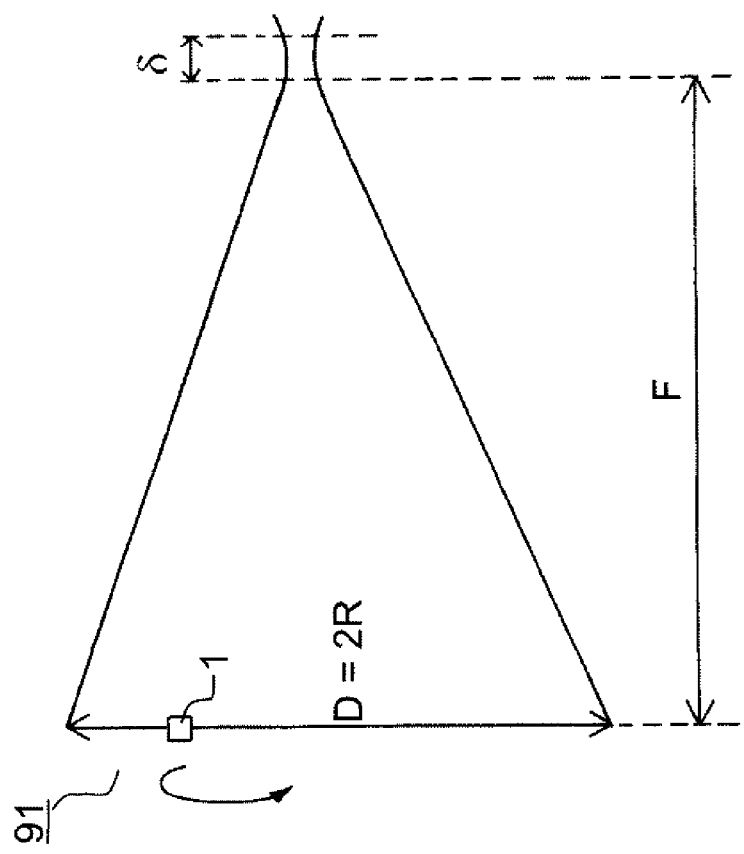

FIG. 9a illustrates the transverse resolution δ. With respect to this required transverse resolution δ, the latter determines the diameter D of the aforementioned circle 40, which is also the diameter D of the focusing lens of the circular scanner 91 formed by the transmitter 2 coupled to the receiver 1 in rotation. This resolution δ is given by the following relation and contributes to defining the dimension D:

$$\delta = 2.44 \cdot \lambda \cdot \frac{F}{D} \quad (3)$$

F being the focal length.

FIG. 9b illustrates a detected signal 92 and the signal-to-noise ratio 93, also called signal ratio on "clutter", obtained when a bright point is detected. This signal-to-noise ratio is defined by the following relation:

$$\frac{S}{B} = 2\frac{\lambda}{R} + A_d \quad (4)$$

where $A_d$ is a Doppler affine.

The definition of the depth of field $\delta_p$ also contributes to the dimension definition D of the focus lens and to the definition of the minimum thickness $e_{min}$ of the objects that can be detected. This depth of field is given by the following relation:

$$\delta_p = 3 \cdot \left(\frac{F}{D}\right)^2 \cdot \lambda \quad (5)$$

The depth of field $\delta_p$ and the speed of the individual, in this instance a pedestrian, moreover contribute to determining the speed v of rotation of the receiver 1.

This speed of rotation $N_R$ in number of revolutions per second is given by the following relation:

$$N_R = \frac{v}{\delta_p} \quad (6)$$

The phase $A_j$ and the amplitude $\Phi_j$ measured on received signal $S_j$ at a position j of the receiver 2 is the contribution of the received signals from the points k reflecting the signal transmitted by the transmitter 1 affected by the Doppler effect due to the rotation. In FIG. 8, a single point k is shown. This signal $S_j$ is given by the following relation, for all the points k:

$$S_j(t) = \sum_k \frac{\exp(jK \cdot r_{j,k})}{r_{j,k}} \cdot G\_transmission_k \cdot G\_reception_j \cdot SER_{j,k} \cdot e^{j2\pi \cdot f_d(t) \cdot t} \quad (7)$$

where:
  exp is the exponential function;
  $G\_transmission_k$ is the transmission gain of the signal transmitted to the point k;
  $G\_reception_j$ is the gain on reception at the position j;
  $r_{j,k}$ is the total distance traveled by the transmitted wave and then reflected by the point k, to the position j of the receiver, in the example of FIG. 8, $r_{j,k}=r_1+r_2$;
  $K=2\pi/\lambda$ as indicated above;

$SER_{j,k}$ at the point k is the distatic radar equivalent surface seen from the receiver as described above;

$$f_d(t) = \frac{2\pi N_1 R}{\lambda} \cos(\theta(x, y, t)), \theta(x, y, t)$$

is the angle formed between the vector relative to the direction of arrival on the circle of analysis and the tangent at the point of reception.

The signal $S_j$ is computed for a given polarization, for example for the transmitted right circular polarization. Depending on the nature of the surfaces at the points k, $S_j$ comprises a right or left circular polarization.

The analysis of the received signal, on the two circular polarizations, makes it possible to determine whether the SER corresponds to a flat surface or to a dihedron. Based on the determination of flat plates and of dihedrons, the processing means 23 can manage to reconstitute an object shape or a beginning of a shape. The shape information obtained is in any case sufficient to suggest, for example, a more in-depth search of the carrier of the object. The detection of dihedrons and of discontinuities advantageously makes it possible to detect notably dangerous objects. In particular, they delimit the objects as indicated above;
the detection is carried out outside of the clutter, by the reverse polarization;
the retrodirectivity is total or partial for the dihedrons.

The dimensions of the detected dihedrons, of the order of two to four wavelengths, are well suited to the transmission frequency at 77 GHz.

The image formation at the processing means is carried out by the integration of the replicas of the transmitted signals. An image Im(x, y) is thus obtained according to the following relation:

$$\text{Im}(x, y) = \int_0^{\frac{N}{N_1}} S_j(t) \cdot \text{replica}(x, y, t) \cdot dt \quad (8)$$

x and y represent the coordinates of a point k in the focus plane at a moment t, N is a number of revolutions.

$S_j(t)$ has been computed by the relation (7). The integration is carried out for all the positions j of the circle, each component $S_j(t)$ being multiplied by the replicas of all the received signals, the term "replica(x, y, t)" forming the total of all these signals. The replica of a signal, a signal that comprises the same phase in absolute value, but reversed. It should be noted that the time expressed by cos θ depends on the position of the bright point and contributes to the "space coloring" and thereby to a better resolution. This spatial resolution is very markedly improved, by integrating the Doppler signal on several revolutions $N_1$.

The phases of the received signals are a priori unknown. Multiplication by the replicas thus defined makes it possible to highlight the detected signals as that illustrated by FIG. 9b. The reconstituted image Im(x, y), as in a radar of the SAR type notably, gives a total or partial view of a detected object. Depending on the shape viewed, for example on the screen of a computer 23, a user may or may not decide to search the individual carrying this object.

Figure 10:
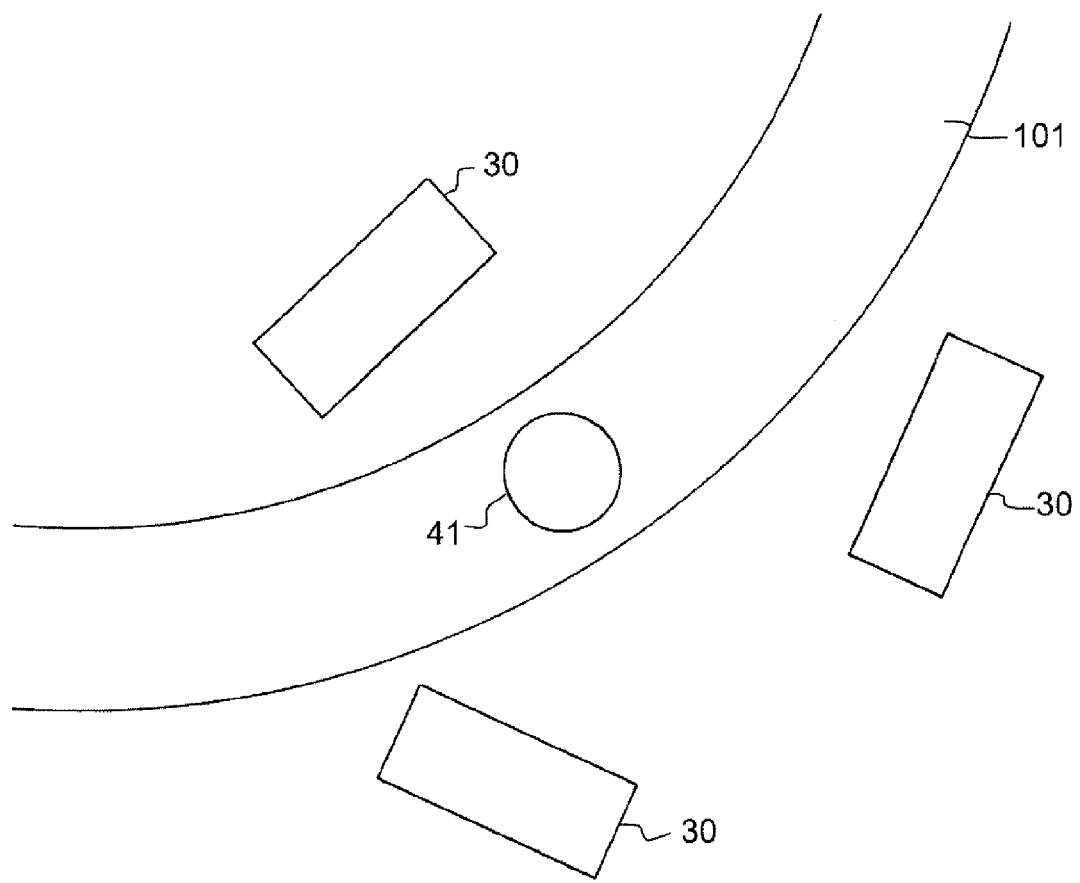
FIG. 10, an exemplary embodiment of a detection system using several devices according to the invention.

FIG. 10 illustrates a detection system comprising several devices according to the invention as described above. This system is fitted, for example, in a protective airlock. This airlock can be installed to filter entrances into several types of public places such as airports for example. The system comprises for example three detection devices, represented by their cases 30. The devices are distributed in a circle, for example uniformly. Detection is then carried out between these cases which allow a comprehensive detection on an individual.

The individuals 41 can be carried by a conveyor belt 101 passing between the devices 30, the speed v of which is well determined. Advantageously, a detection according to the invention does not require the individual to stop or be made stationary at the devices 30. This allows a continuous flow of the persons to be monitored, for example the passengers of an aircraft.

The invention claimed is:

1. A device for detecting at least one object carried by an individual, the device comprising:
    at least one microwave-frequency transmitter and a microwave-frequency receiver, the receiver or the at least one transmitter being configured to rotate relative to the other in a circle of relative rotation, the at least one transmitter being configured to transmit a signal toward the individual for several positions j of the at least one transmitter or the receiver on the circle of relative rotation;
    laser telemeters situated around the at least one transmitter and the receiver, wherein the laser telemeters are configured to determine a distance from the individual to the device, and wherein the distance from the individual to the device is used to focus the signal transmitted by the at least one transmitter on a plane including the individual; and
    processing means for forming a radar image from signals reflected by points k of an object and received by the receiver at the positions j.

2. The device as claimed in claim 1, wherein the at least one transmitter transmits on two polarizations, the nature of the object being defined as a function of the polarization of the signals reflected by points k of the object.

3. The device as claimed in claim 1, wherein the at least one transmitter transmits in millimetric frequencies.

4. The device as claimed in claim 3, wherein the at least one transmitter transmits at a frequency of 77 GHz.

5. The device as claimed in claim 1, wherein the receiver is situated on a rotatable disk at a predetermined distance from the center of the rotatable disk, and the at least one transmitter is situated substantially at the center of the rotatable disk.

6. The device as claimed in claim 5, wherein the rotatable disk is a type of laser disk.

7. The device as claimed in claim 5, wherein the rotatable disk is rotated by a brushless synchronous motor.

8. The device as claimed in claim 1, wherein the receiver is situated substantially at the center of a rotatable disk, and the at least one transmitter is situated on the rotatable disk at a given distance from the center of the rotatable disk.

9. The device as claimed in claim 8, wherein the rotatable disk is a type of laser disk.

10. The device as claimed in claim 8, wherein the rotatable disk is rotated by a brushless synchronous motor.

11. The device as claimed in claim 1, wherein the at least one transmitter comprises a diode of a Gunn type.

12. A system for detecting objects carried by the individual, comprising at least two of the device as claimed in claim 1.

13. The system as claimed in claim 12, wherein the system comprises three of the device as claimed in claim 1 distributed in a circle, wherein the detection of the objects carried by the individual occurs inside the circle.

* * * * *

UNITED STATES PATENT AND TRADEMARK OFFICE
CERTIFICATE OF CORRECTION

PATENT NO.        : 8,593,332 B2                                      Page 1 of 1
APPLICATION NO.   : 12/742884
DATED             : November 26, 2013
INVENTOR(S)       : Chekroun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this
Twenty-second Day of September, 2015

Michelle K. Lee
*Director of the United States Patent and Trademark Office*